United States Patent [19]

Omori et al.

[11] 4,405,951
[45] Sep. 20, 1983

[54] FACSIMILE CONTROL SYSTEM

[75] Inventors: Takashi Omori; Kenji Koguchi, both of Kanagawa; Masahiko Yamagishi; Higehumi Takeuchi, both of Nagano, all of Japan

[73] Assignee: Fuji Xerox Co., Ltd., Kanagawa, Japan

[21] Appl. No.: 217,304

[22] Filed: Dec. 17, 1980

[30] Foreign Application Priority Data

Dec. 18, 1979 [JP] Japan ................ 54-163599

[51] Int. Cl.³ .............................. H04N 1/32
[52] U.S. Cl. ...................... 358/256; 358/264; 364/900
[58] Field of Search ............... 358/256, 257, 258, 264, 358/903; 364/200 MS File, 900 MS File

[56] References Cited

U.S. PATENT DOCUMENTS

| | | | |
|---|---|---|---|
| 4,096,566 | 6/1978 | Borie et al. | 364/200 |
| 4,183,089 | 1/1980 | Daughton | 364/900 |
| 4,188,668 | 2/1980 | Finlay | 364/900 |

FOREIGN PATENT DOCUMENTS 137777 10/1980 Japan .................. 358/256

OTHER PUBLICATIONS

Hosagi et al–PPC Facsimile "Panafax 6000"—National Tech Report, vol. 24, #4, Aug. 1978, pp. 634–646.
Tanaka et al.—High Speed Digital Facsimile UF-22-00—National Tech Report, vol. 24, No. 4, Aug. 1978, pp. 617-633.
Ohta et al.—High Speed Facsimile-Hifax HF950-MR/960MR—Hitachi Review, vol. 29, Aug. 1980 #4, pp. 205-210.

*Primary Examiner*—Joseph A. Orsino, Jr.
*Attorney, Agent, or Firm*—Sughrue, Mion, Zinn, Macpeak and Seas

[57] ABSTRACT

A facsimile system including a facsimile control system implemented with plural microcomputers one of which acts as a master microcomputer coupled to the other microcomputers in a master/slave relationship. At least one of the slave microcomputers has halt and reset inputs coupled to an input/output port of the master microcomputer while another one of the slave microcomputers is coupled through a sub-system in the facsimile system, such as a drive control circuit, to an input/output port of the master microcomputer.

3 Claims, 8 Drawing Figures

FACSIMILE CONTROL SYSTEM

BACKGROUND OF THE INVENTION

The present invention relates to facsimile control systems using a multi-microcomputer system. More particularly, the invention relates to a facsimile control system using a multi-microcomputer system in which a plurality of microcomputers are connected in a hierarchical arrangement so that various controls and system supervision can be carried out with a high efficiency.

Figure 1:
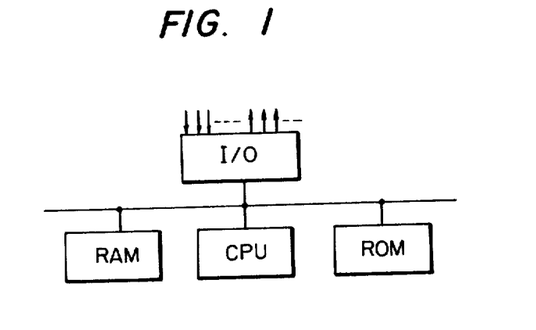
FIG. 1 is a block diagram showing a typical arrangement of a one-chip microcomputer.

Due to the recent rapid progress in semiconductor manufacturing techniques, one-chip microcomputers incorporating a central processing unit (CPU) having calculation and decision functions, a random access memory (RAM) for storing data, a read-only memory (ROM) for storing processing programs, and an input-/output control unit (I/O) have become available at a relatively low price. An example of such a one-chip microcomputer is as shown in FIG. 1.

These one-chip microcomputers have been used in facsimile systems to control and detect various functions and data operations.

For instance in the case of telephony facsimile which is most extensively employed, among the various control functions, the following can be suitably performed by a microcomputer:

(1) Line control

A so-called "connection control" for calling and incoming signals.

(2) Transmission control

Controlling of procedures for mutually transmitting and receiving control data and video data between the calling station and the called station after the telephone line has been engaged and connected.

(3) Mechanism control

Controlling of the operations of the various operations in the facsimile system such as controlling the start and stop of sub-scanning.

(4) Man machine interface control

Sensing of operating switches and controlling of various displays.

Figure 2:
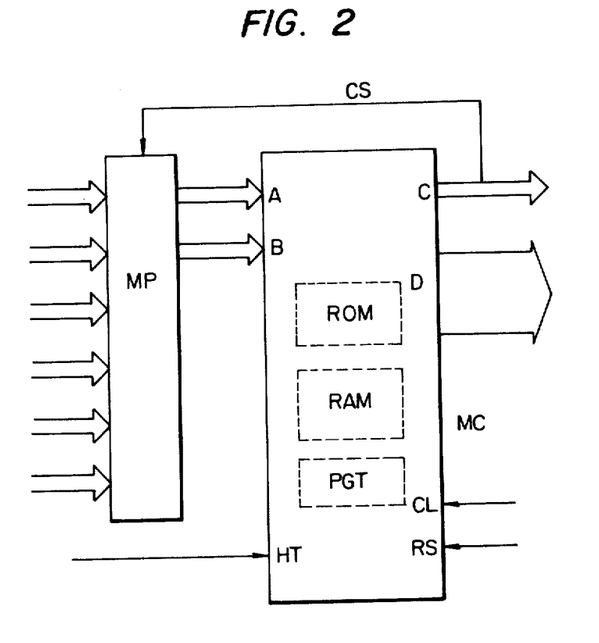
FIG. 2 is a block diagram showing a typical arrangement of a one-chip microcomputer including peripheral equipment.

An example of microcomputer and peripheral circuit employable in such a control system is shown in FIG. 2. In FIG. 2, a microcomputer M includes on a single chip a program ROM, a work area registering RAM, input ports A and B, output ports C and D, a programmable timer PGT, a clock input terminal CL, a reset input terminal RS and a halt signal input terminal HT. A multiplexer MP is provided to increase the number of input/output ports with the multiplexer MP being controlled by the output CS of the microcomputer M.

In order to control facsimile transmission and reception with such a microcomputer, it is necessary to provide a number of input/output sections. However, since the number of input/output terminals is limited for a one-chip microcomputer, the shortage of input/output terminals is complemented by adding a latch circuit or a multiplexer externally as shown in FIG. 2. The cost of adding such a latch circuit or a multiplexer is however high, sometimes higher than the cost of the microcomputer. Furthermore, since it is necessary to simultaneously perform the above-described various control and check functions, sometimes the employment of only one microcomputer is insufficient because the microcomputer would be overloaded and the read-only memory built into the microcomputer may be inadequate in capacity because of long program steps. In order to overcome this difficulty, a technique has been proposed in the art in which data is processed by a multimicrocomputer system using a plurality of microcomputers.

In general, in a conventional multi-computer system, in order to mutually transmit and receive data between the computers, the computers are connected with a common data bus line and a control line and data exchange is carried out between the computers after signal confirmation in such a manner that, when one of the computers transmits a data transfer signal to the other computer, the other computer outputs an acknowledge signal upon receipt of the data transfer signal. However, it is impossible for a one-chip microcomputer to employ this technique because the data bus line and the control line do not extend outside the chip.

SUMMARY OF THE INVENTION

In view of the foregoing, the invention provides a facsimile control system in which a multi-microcomputer system using a plurality of one-chip microcomputers is employed to positively and efficiently control a facsimile systems having a number of functions. The facsimile control system of the invention can be realized at a low cost.

In the system of the invention, a plurality of one-chip microcomputers are connected in a hierarchical arrangement with one of the one-chip microcomputers serving as a master microcomputer and the remaining as slave microcomputers.

More specifically, the invention provides a facsimile system including a plurality of facsimile sub-systems, a plurality of one-chip microcomputers connected to form heirarchical arranged master/slave relations with the microcomputers being coupled to the sub-systems such that functions of controlling and checking sub-systems in the facimile system are performed by the microcomputers. At least one of the microcomputers functions as a slave microcomputer having an input/output port connected through one of the sub-systems to an input/output port of one of the microcomputers which functions as a master microcomputer. At least one of the microcomputers functioning as a slave microcomputer has halt and reset inputs connected directly to an input-/output port of the microcomputer functioning as a master microcomputer.

DESCRIPTION OF THE PREFERRED EMBODIMENTS

Figure 3:
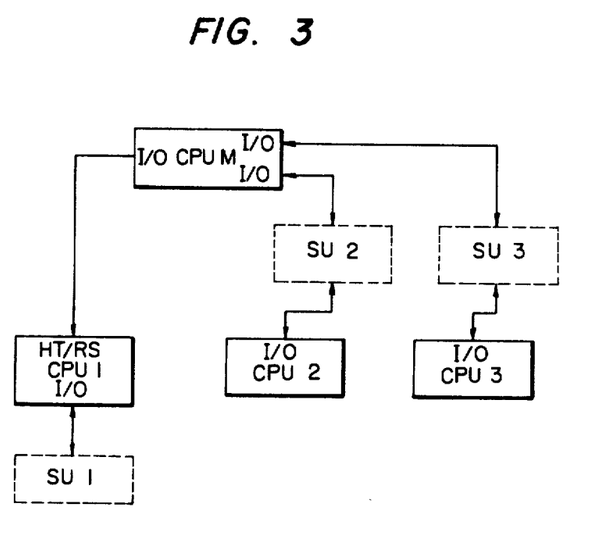
FIGS. 3 and 4 are, respectively, block diagram showing first and second embodiments of systems of the invention.

A preferred embodiment of a facsimile control system of the invention, as shown in FIG. 3, includes a master-microcomputer CPU M, slave microcomputers CPU 1 through CPU 3, and sub-units (systems) SU 1 through SU 3. One of the input/output ports I/O of the master microcomputer CPU M is connected to the input HT/RS of the slave microcomputer CPU 1, and the remaining input/outputs I/O are connected through the sub-units SU 2 and SU 3 to the input/output ports I/O of the slave microcomputers CPU 2 and CPU 3, respectively.

Figure 4:
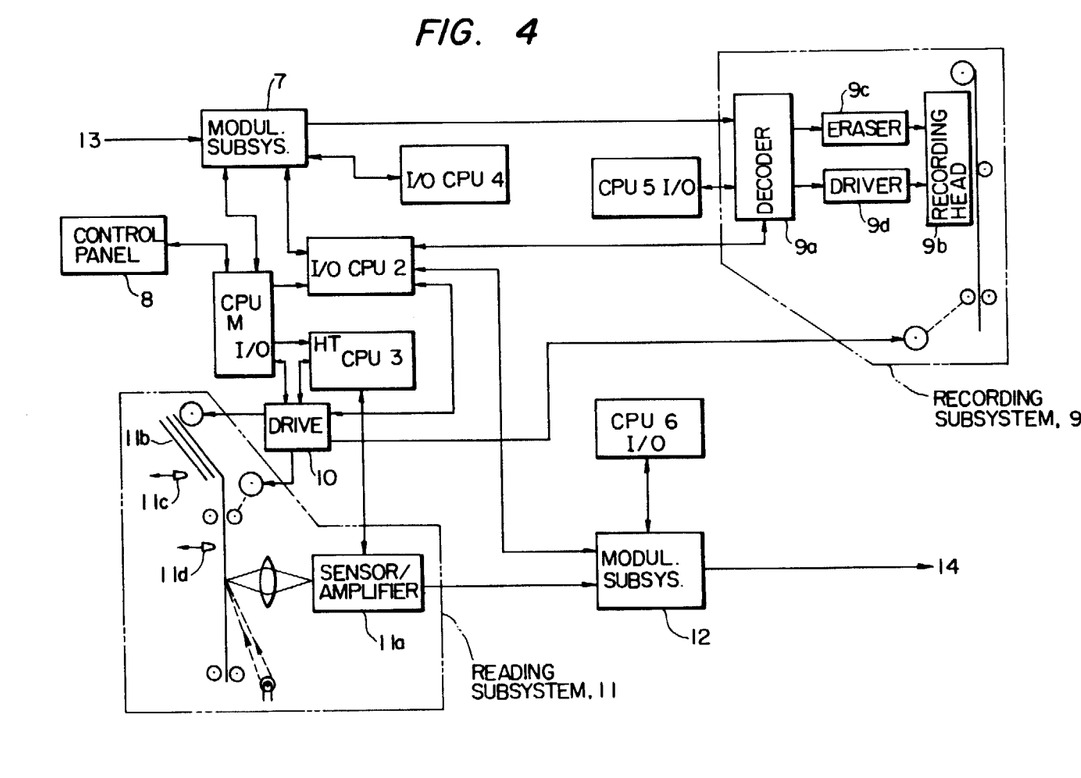

The master microcomputer CPU M uses the reset input RS or the halt input HT of the slave microcomputer CPU 1 to control the start and stop thereof. Control signals and data are mutually transmitted between the master microcomputer CPU M and the sub-units SU 2 and SU 3 which are connected between the computer CPU M and the slave microcomputers CPU 2 and CPU 3. Accordingly, the results of simple operations such as AND and OR operations carried out on the data which are obtained by the sub-units SU 1 and SU 2 can be applied to or received from the slave microcomputers CPU 2 and CPU 3 as if they were input or drive signals from a single sensor. Furthermore, as the sub-units SU 2 and SU 3 are controlled by both the master and slave microcomputers, more intricate control can be carried out. FIG. 4 is a block diagram showing another embodiment of the invention in which six one-chip microcomputers are employed. More specifically, one of the six one-chip microcomputers is used as a master microcomputer CPU M and the remaining ones are used as slave microcomputers CPU 2 through CPU 6 to control a facsimile system. As is apparent from FIG. 4, the microcomputers CPU 2 and CPU 3 are in a slave relation to the master microcomputer CPU M while the microcomputers CPU 4 through CPU 6 are in a slave/master relation to the microcomputer CPU 2 thus forming a hierarchical arrangement.

The microcomputers CPU 2 through CPU 5 control a signal receiving system, a signal transmitting system, an AGC system, a recording system and a modulating system, respectively. In FIG. 4, reference numerals 7 through 12 designate modulating, control panel, recording, mechanism driving, reading and modulating sub-systems, respectively, 14 a transmission signal, 9a a decoder, 9b recording head, 9c a driver, 9d a source driver, 11a a sensor and an amplifier, 11b a transmitting original, 11c a transmitting original detector, and 11d a scan original detector.

The controls of the various sections of the facsimile system thus organized are assigned to the microcomputers for instance as follows:

| Control item | CPU | Contents of control |
| --- | --- | --- |
| System control | M | Start and stop of CPU 3 |
| | " | Start and stop of CPU 2 |
| | " | On and off of main power switch |
| | " | Resetting of system |
| | 2 | Monitoring of CPU 5 |
| | 2 | Monitoring of CPU 6 |
| | 2 | Monitoring of CPU 4 |
| Mechanism control | M | Buzzer, monitor control |
| | " | Detection of presence or absence of signal receiving sheet |
| | 3 | Original feeding motor control |
| | " | Automatic original feeding device control |
| | 5 | Signal receiving sheet feeding motor control |
| Line control | M | Line connecting and disconnecting |
| Transmission | M | Communication stop control (Abnormal ending process) |
| | " | Communication stop control (Normal ending process) |
| | " | Abnormal signal transmission |

| Control item | CPU | Contents of control |
| --- | --- | --- |
| | " | Received signal detection |
| | 2 | Signal receiving sequence control |
| | " | Control tone detection and discrimination |
| Transmission control | 2 | Control tone code output |
| | " | No-signal detection |
| | 5 | Code generation for received tone |
| | 3 | Signal transmitting sequence control |
| | " | Control tone detection and discrimination |
| | " | Code generation for transmitting tone |
| | " | Transmitting data processing |
| | " | Transmitting destination discrimination |
| | 5 | White line skip process |
| | 6 | Code generation for transmitting tone |
| | 4 | Synchronizing signal transmission |
| | " | AGC correction |
| | " | Carrier reproduction |
| | " | Phase synchronization |
| Man-machine interface | M | Operator panel control |

For instance, the signal transmission operation will be described. Upon depression of a transmission switch on the operating panel of the sub-system 8 in FIG. 4, a transmission instruction is applied to the master microcomputer CPU M. Upon reception of the instruction, the master microcomputer CPU M operates to turn on the main power switch, to instruct the mechanism driving sub-system 10 to start the main motor and to start the signal transmission system microcomputer CPU 3 thus starting the signal transmission.

At the same time, the microcomputer CPU 3 operates to initially set the reading sub-system 11 to cause the reading sub-system 11 to read an original and to instruct the mechanism position driving sub-system 11 to read an original to a predetermined. While the original is being fed, the microcomputers CPU 3 and CPU 6 drive the modulating sub-system 12 to carry out a pre-set procedure with the transmission destination. When the original has reached the predetermined position, the reading sub-system 11 carries out its reading operation according to timing signals provided by the microcomputer CPU 3 and applies the read-out data to the modulating sub-system 12. In the modulating sub-system 12, the data from the microcomputer CPU 3 is modulated and outputted.

If, in this operation, no effective video data is available in the read-out data (for instance at least a portion of the contents of the original is all white data), the microcomputer CPU 3 causes the sub-system 12 to transmit, instead of the video data, a code representative of the fact that no effective video data is available so that the transmission time is reduced.

When an abnormal condition occurs in the system during the above-described operation, the master microcomputer CPU M detects it to stop the microcomputer CPU 3 and then to reset the system.

On the other hand, when one original has been correctly read, the master microcomputer CPU M detects the rejection of the original from an output signal of the mechanism driving sub-system 10. In the case where another original is provided, the master microcomputer CPU M instructs the signal transmission system microcomputer CPU 3 to again perform the same reading sequence. When all of the originals set in the reading sub-system 11 have been transmitted in a manner as described above, the master microcomputer CPU M instructs the microcomputer CPU 3 to stop the transmission and then turns off the main power switch.

Next, the operation for signal reception will be described. During periods other than the operating time, the master microcomputer CPU M monitors through the demodulating sub-system to determine whether or not a signal 13 from the destination has been received. Upon detection of the signal 13, the master microcomputer CPU M operates to start the recording microcomputer CPU 2, to turn on the main power switch, and to instruct mechanism driving sub-system 10 to start the main motor. Then, the master microcomputer CPU M detects whether or not the signal receiving sheet is available and is correctly positioned so as to confirm that the signal can be received. In the event that the master microcomputer CPU M detects that the signal cannot be received, the master microcomputer CPU M instructs the control panel sub-system 8 to display "abnormal" and to operate the warning buzzer and instructs the microcomputer CPU 2 to stop its operation.

On the other hand, while the master microcomputer CPU M is carrying out a series of detection operations, the demodulating recording microcomputer CPU 2 together with the modulating microcomputer CPU 6 drives the demodulating sub-system 12 to form a liason with the destination. During the liason period, in response to an answer from the destination, the recording microcomputer CPU 2 together with the AGC microcomputer CPU 4 instructs the demodulating sub-system 7 to initially set the AGC level and the carrier reproduction level. When the various sections have been initially set and the necessary detections have been accomplished as described above, the microcomputer CPU 2 together with the recording microcomputer CPU 5 controls the decoder so that video data from the demodulating sub-system 7 is recorded on the signal receiving sheet and at the same time controls the mechanism driving sub-system 10 so that the recording sheet is fed in synchronization with the transmission of the video data.

While the video data is being recorded as described above, the microcomputer CPU 4 controls the demodulating sub-system 7 at all times according to the synchronizing signals in the video data so that the video data is demodulated correctly. On the other hand, when the demodulating sub-system 7 detects a code representative of "all white" from the received signal 13 during this period, the detection of the code is communicated to the microcomputer CPU 2 whereupon the CPU 2 suspends the recording operation of the microcomputer CPU 5 and controls operations so that the sheet feeding operation is effected.

While data recording is carried out in the above-described procedure, similarly as in the signal transmission period, the master microcomputer CPU M detects whether or not the system is in an abnormal state. Upon detection of any abnormal condition, the master microcomputer CPU M operates to correct the abnormal condition. After signal reception has been satisfactorily accomplished, the master microcomputer CPU M instructs the recording microcomputer CPU 2 to stop its operation and thereafter resets the system and turns off the main power.

During the signal transmission or reception periods, the lines are connected to the systems according to instructions from the master microcomputer CPU M.

Figure 5A:
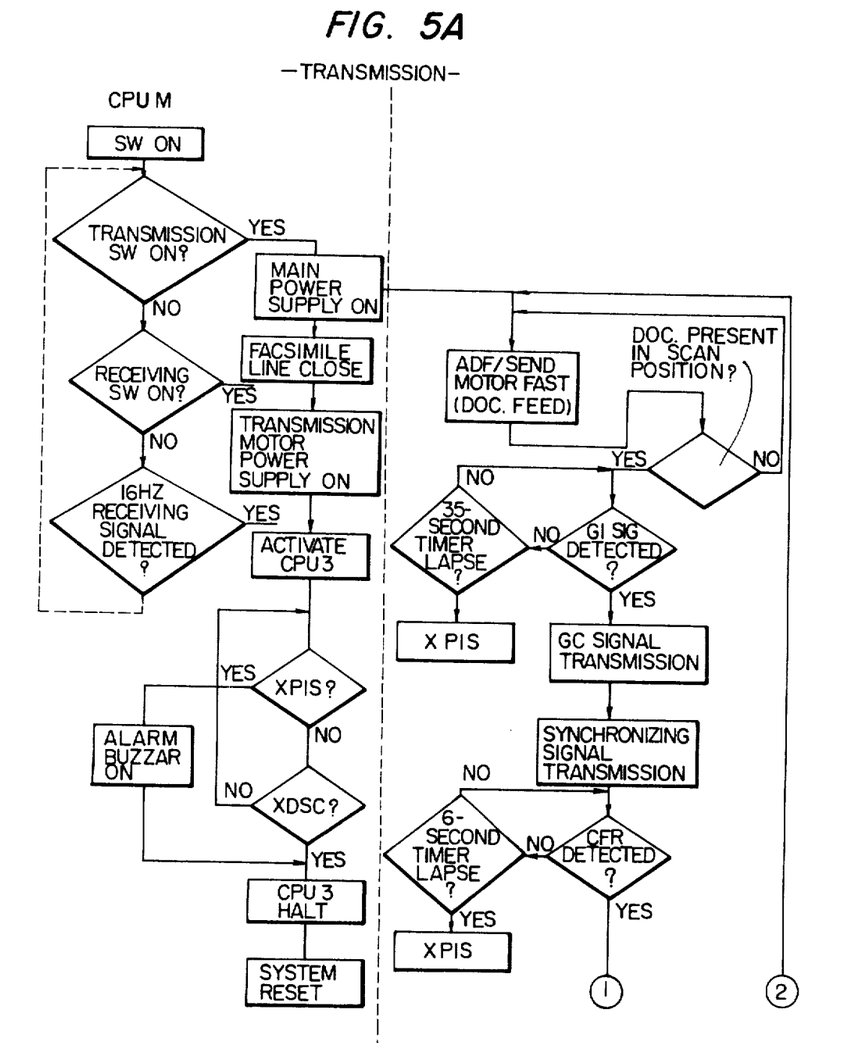
FIGS. 5A and 5B are a flow chart for transmission operations of the embodiment of FIG. 4, and FIGS. 6A and 6B are a flow chart for receiving operations of the embodiment of FIG. 4.
Figure 5B:
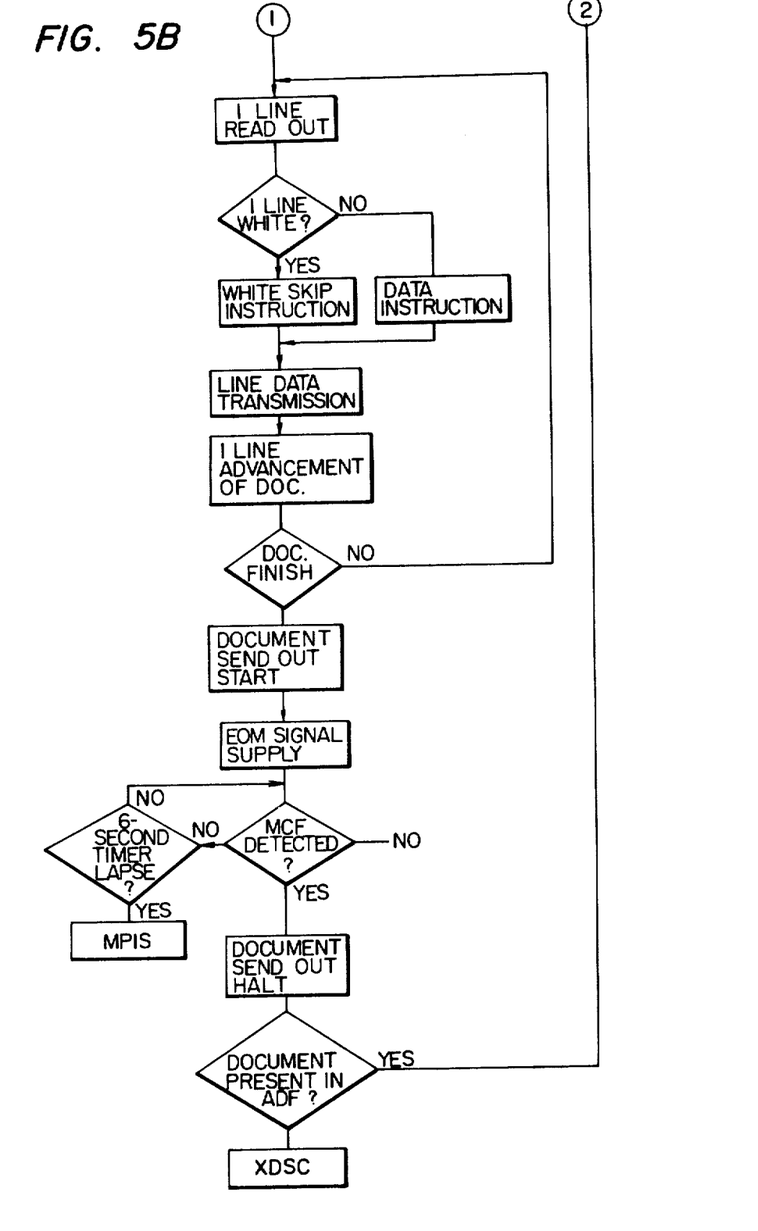
Figure 6A:
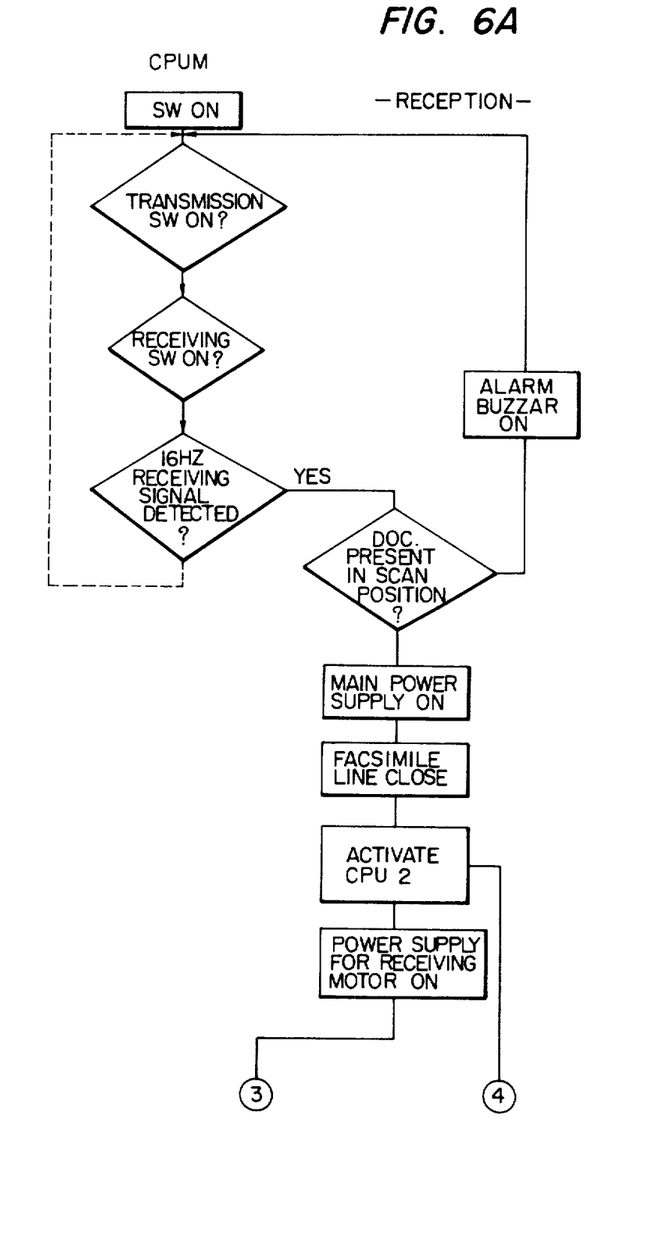
Figure 6B:
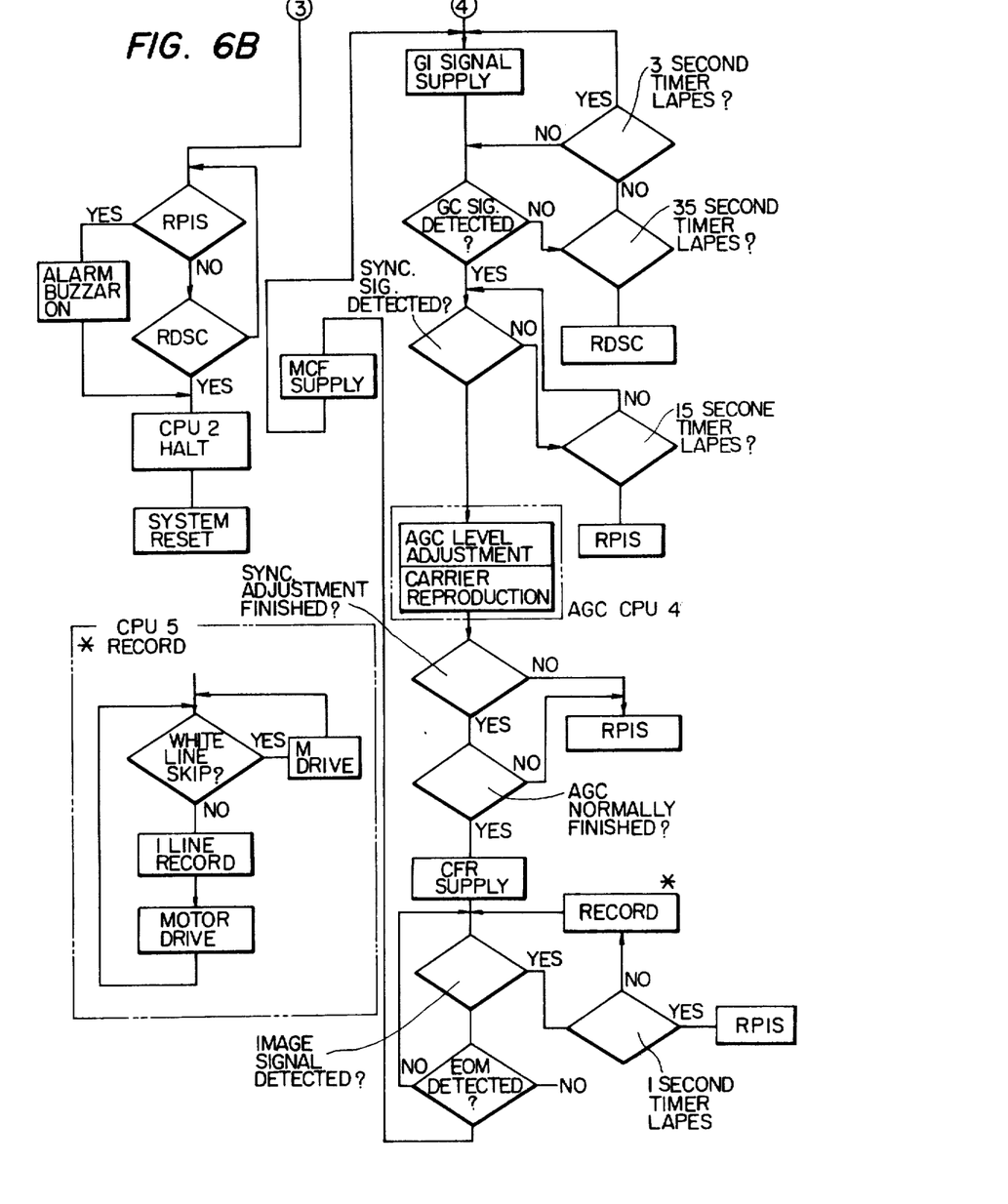

FIGS. 5A and 5B, taken together, are a flow chart of the transmission operations and FIGS. 6A and 6B, taken together, are a flow chart of the receiving operations. In the flow chart of FIGS. 5A, 5B, 6A and 6B, the abbreviation CED indicates Called Station Identification, CFR indicates Confirmation to Receive, EOM is End Message, GC is Group Command, GI to Group Identification and MCF is Message Confirmation.

As is clear from the above description, according to the invention, various control and detection functions of the facsimile system can be quickly, positively and effectively performed by a multi-microcomputer system composed of a plurality of one-chip microcomputers. That is, multi-function control of high reliability is provided for the facsimile system. In addition, according to the invention, the sub-systems (units) are inserted between the master microcomputer and the slave microcomputers so that the sub-systems (units) can be controlled by the master and slave microcomputers. Thus, the multi-microcomputer system according to the invention can perform various complex and intricate controls compared with those which can be done by a conventional simple hierarchically arranged computer system.

What is claimed is:

1. A facsimile system, comprising:
   a first microcomputer (CPU M) functioning as a master microcomputer coupled through input/output ports thereof to control system drive control means, said drive control means being coupled through input/output ports thereof to a second microcomputer (CPU 3) functioning as a slave microcomputer, said second slave microcomputer being coupled through halt/reset inputs thereof to said master microcomputer;
   a reading subsystem, controlled through input ports thereof connected to said drive control means, comprising a sensor/amplifier, said sensor/amplifier being controlled through input/output port couplings thereof by said second microcomputer functioning as a slave microcomputer and being coupled through an output port thereof to a modulating subsystem; and
   a third microcomputer functioning as a slave microcomputer coupled through an input port thereof to respond to said master microcomputer and through input/output ports thereof to monitor said drive control means and said modulating subsystem, said modulating subsystem being further responsive through input/output port couplings thereof to a fourth microcomputer serving as a slave microcomputer.

2. A facsimile system, comprising:
   a microcomputer functioning as a master microcomputer coupled through input/output ports thereof to control system drive control means, said drive control means being responsive through input/output port couplings thereof to a second microcomputer serving as a slave microcomputer, said second slave microcomputer being responsive through halt/reset inputs thereof to said master microcomputer;
   a recording subsystem, including a decoder coupled to operate erasing and driving means for a recording head, responsive to said drive control means and responsive to a third microcomputer serving as a slave microcomputer coupled through input/output ports thereof to said decoder;

a fourth microcomputer, functioning as a slave microcomputer, responsive through input port couplings thereof to said master microcomputer and controlling said drive control means and said recording subsystem through input/output ports couplings thereof; and a modulating subsystem responsive through input/output ports thereof to said master microcomputers to said fourth microcomputer functioning as a slave microcomputer and to a fifth microcomputer functioning as a slave microcomputer, wherein said recording system is responsive to an output from said modulating subsystem.

3. A facsimile system comprising: a plurality of facsimile sub-systems; a plurality of one-chip microcomputers connected to form a hierarchical arrangement in master/slave relationship, said microcomputers being coupled to said sub-systems such that functions of controlling and checking sub-systems in said facsimile system are performed by said microcomputers, at least one of said microcomputers functioning as a slave microcomputer having an input/output port connected through one of said sub-systems to an input/output port of one of said microcomputers functioning as a master microcomputer, wherein said facsimile sub-systems comprise drive control means for controlling operations of driving means in a recording sub-system and a reading sub-system, said reading sub-system comprising a sensor/amplifier, a recording sub-system including a decoder coupled to operate erasing and driving means for a recording head, a first modulating sub-system coupled to said decoder and a second modulating sub-system coupled to said sensor/amplifier, and a control panel coupled to an input/output port of said microcomputer functioning as a master microcomputer; a second one of said microcomputers functioning as a slave microcomputer having input/output ports coupled to an input/output port of said microcomputer functioning as a master microcomputer, said first modulation sub-system, said second modulation sub-system, said drive control means, and said decoder; a third one of said microcomputers functioning as a slave microcomputer having halt and reset inputs coupled to said master microcomputer and having input/output ports coupled to said drive control means and said sensor/amplifier; a fourth one of said microcomputers functioning as a slave microcomputer having an input/output port coupled to said first modulation sub-system; a fifth one of said microcomputers functioning as a slave microcomputer having an input/output port coupled to said decoder; and a sixth one of said microcomputers functioning as a slave microcomputer having an input/output port coupled to said second modulation sub-system, said drive control means also being coupled directly to an input/output port of said microcomputer functioning as a master microcomputer.

* * * * *